United States Patent [19]

Turczyk

[11] 4,329,310

[45] May 11, 1982

[54] METHOD OF EXTRUDING DISCRETE PHASE ELASTOMER CONTAINING THERMOPLASTIC POLYMERS

[75] Inventor: Michael J. Turczyk, Yonkers, N.Y.

[73] Assignee: Stauffer Chemical Company, Westport, Conn.

[21] Appl. No.: 756,950

[22] Filed: Jan. 5, 1977

[51] Int. Cl.$^3$ ............... D01F 1/10; D01F 6/04; D01F 6/16; D01F 6/28

[52] U.S. Cl. ............... 264/211; 525/227; 525/230; 525/238; 525/240

[58] Field of Search ........... 260/897 R, 897 B, 897 A, 260/881, 898; 264/211; 525/227, 230, 238, 240

[56] References Cited

U.S. PATENT DOCUMENTS

| | | | |
|---|---|---|---|
| 3,366,712 | 1/1968 | Tapas et al. | 260/898 |
| 3,413,250 | 11/1968 | Varron et al. | 260/898 X |
| 3,655,829 | 4/1972 | Ronzoni et al. | 260/898 X |
| 3,728,418 | 4/1973 | Gleason | 260/898 |
| 3,944,631 | 3/1976 | Yu et al. | 260/881 |
| 4,051,096 | 9/1977 | Koseki et al. | 260/897 A |
| 4,094,948 | 6/1978 | Blickenstaff | 264/211 X |
| 4,126,662 | 11/1978 | Middlebrook | 264/211 X |
| 4,152,495 | 5/1979 | Labar | 264/211 X |

OTHER PUBLICATIONS

Modern Plastics Encyclopedia, 1974–1975, vol. 51, pp. 234,238,240.

*Primary Examiner*—Howard E. Schain
*Attorney, Agent, or Firm*—Richard P. Fennelly

[57] ABSTRACT

Discrete phase thermoplastic polymers comprising crosslinked acrylate or methacrylate, crosslinked styrene-acrylonitrile, and uncrosslinked styrene-acrylonitrile components can be extruded to provide products having a high surface gloss by the use of an effective amount of a lubricant selected from the group consisting of high molecular weight polymers of ethylene and high molecular weight copolymers of ethylene and vinyl acetate.

6 Claims, No Drawings

METHOD OF EXTRUDING DISCRETE PHASE ELASTOMER CONTAINING THERMOPLASTIC POLYMERS

BACKGROUND OF THE INVENTION

1. Field of the Invention

The present invention is directed to a method of forming extruded products of discrete phase, elastomer-containing thermoplastics having a high surface gloss and to such extruded products.

2. Description of the Prior Art.

The discrete phase, elastomer containing polymer composition which is extruded in accordance with the present invention is a known product and is described in U.S. Pat. No. 3,944,631 to A. J. Yu et al. It is suitable for use as a substitute for acrylonitrile-butadiene-styrene (ABS) polymers. Lubricants that have been conventionally used with ABS polymers, e.g., the metallic stearates, glycerol monostearate and ethylene-bis-stearamide waxes (see Modern Plastics Encyclopedia, 1974-75, pp. 234, 238 and 240) have not resulted in extruded products having the high surface gloss required for some applications.

SUMMARY OF THE PRESENT INVENTION

It has now been found that high surface gloss extruded products of discrete phase, elastomer-containing thermoplastics comprising crosslinked acrylate or methacrylate, crosslinked styrene-acrylonitrile, and uncrosslinked styrene-acrylonitrile components can be formed by using an effective amount for lubrication of high molecular weight polyethylene and polyethylenevinyl acetate copolymers.

DESCRIPTION OF THE PREFERRED EMBODIMENTS

The basic discrete phase, elastomer-containing thermoplastic polymer composition which is extruded according to the present invention is a (meth)acrylate/styrene/acrylonitrile (hereinafter called "ASA") composition formed in accordance with U.S. Pat. No. 3,944,631 to A. J. Yu et al., which is incorporated herein by reference. This polymer composition is formed by the following three step sequential polymerization:

1. emulsion polymerizing a monomer charge of a $C_2$–$C_{10}$ alkyl acrylate or a $C_8$–$C_{22}$ alkyl methacrylate in an aqueous polymerization procedure in the presence of an effective amount of a suitable di-or polyethylenically unsaturated crosslinking agent. The $C_4$–$C_8$ alkyl acrylates are preferred acrylate monomers for use in this step;

2. emulsion polymerizing a monomer charge of styrene and acrylonitrile in an aqueous polymerization procedure in the presence of an effective amount of a suitable di-or polyethylenically unsaturated crosslinking agent. This procedure is carried out in the presence of the product from Step 1 so that the crosslinked acrylate or methacrylate and crosslinked styrene-acrylonitrile phases surround and penetrate one another.

If desired, Steps 1 and 2 can be reversed; and 3. either emulsion or suspension polymerizing a monomer charge of styrene and acrylonitrile in the absence of crosslinking agent in the presence of the product resulting from the previously described steps.

The ASA product to which the present invention relates contains from about 10% to about 50%, by weight, of crosslinked acrylate or methacrylate, from about 5% to about 35%, by weight, of crosslinked styrene-acrylonitrile and from about 15% to about 85% by weight uncrosslinked or linear styrene-acrylonitrile. It contains little graft polymerization between the styrene-acrylonitrile copolymer segments and the crosslinked acrylate or methacrylate component.

Further details regarding how this type of polymer composition is formed can be found in U.S. Pat. No. 3,944,631 to A. J. Yu et al.

Extrusion of the above described ASA polymer compositions into such finished products as sheets, pipes, or more complex shapes can be accomplished quite readily on commercially available extrusion apparatus, such as 24:1 length to diameter extruders having a diameter of 4½ inches (11.4 cm.). Either single or two stage extruders with compression ranges of from 2:1 to 2.5:1 can be used. The extrusion temperature for this polymer composition can range anywhere from about 380° F. (193° C.) to about 450° F. (232° C.).

In order to obtain the benefits of the present invention and obtain high surface gloss ASA extruded products, it is necessary to carry out the extrusion operation with an effective amount of a selected type of lubricant. The lubricants for use in the present invention are those high molecular weight polyethylene and poly(ethylene/vinyl acetate)polymers having a molecular weight of from about 100,000 to about 1,000,000. Such polymers generally have a specific gravity of from about 0.90 to about 0.94 and a melt index of from about 1.0 to about 25 when tested in accordance with ASTM D-1238-6ST. This test gives a measure of the flowability or melt viscosity of the polyethylene or poly(ethylene/vinyl acetate)polymer. The melt index values that are given for such a test represent the amount, in grams, of resin that can be forced through a 0.0825 in. (0.2096 cm.) orifice when subjected to a 2160 g. force in 10 min. at a temperature of 190° C. Suitable polymers having the high molecular weight, melt index and specific gravity characteristics described above are available commercially under the tradenames "Alathon PE 4275" from E. I. du Pont de Nemours and Co. and "PEP-680" from Union Carbide Corporation. Effective amounts of such polymers for use in the present invention can range from about 0.5 to about 1.5 parts by weight of lubricant per 100 parts by weight of ASA resin. Although much lower molecular weight polyethylene polymers have been suggested as lubricants for polyvinyl chloride polymers (U.S. Pat. No. 3,640,828 to W. Brotz et al.), such lower molecular weight polymers do not give the desired glossy extrudate when used with the particular type of discrete phase, elastomer containing polymer composition described in U.S. Pat. No. 3,944,631 to A. J. Yu et al. The term "high surface gloss" as used herein to describe the gloss characteristics of the ASA extrudate is meant to mean ASA products which will reflect about 80% or greater of incident light (when measured at a 60° angle from the perpendicular to the surface of the test sample) and about 40% or greater of incident light (when measured at a 20° angle from the perpendicular to the surface of the test sample) with a Gardner Glossmeter in accordance with ASTM D 2457-70. In such a test the greater the amount of reflected light, the more glossy the surface of the product. ASA resin extruded without the use of the selected type of polyethylene lubricant will show reflectance values of about 11-18% (measured at a 60° angle) and about 3-4% (measured at a 20° angle).

The lubricant used in accordance with the present invention can be either added to the polymer stock prior to the extrusion operation or, if a very high degree of surface gloss is desired in the final product, the lubricant can be passed through the extrusion apparatus prior to the actual extrusion run of the thermoplastic polymer. This latter operation coats the interior metallic surfaces of the extrusion apparatus with the lubricant additive thereby allowing the production of a product having a high surface gloss.

The present invention is further illustrated by the Examples which follow:

EXAMPLE 1

This example illustrates how the ASA resin, which is extruded in connection with the present invention, is made. The process for making it is set forth in U.S. Pat. No. 3,944,631 to A. J. Yu et al. The resin was a 27.5% crosslinked poly(butyl acrylate)/10% crosslinked poly(styrene-acrylonitrile)/62.5% uncrosslinked poly(styrene-acrylonitrile) composition. It was formed by using the following three-step polymerization procedure.

RUN A

Step 1:

(a) To two 55 gal. (208.175 liter) drums of butyl acrylate was added 442 g. of butylene glycol diacrylate crosslinking agent. The drums were closed and were agitated for about 15 minutes.

(b) An evacuated 500 gal. (1892 liter) glass lined reactor was charged with the following reagents:

| Reagent | Amount | | |
|---|---|---|---|
| Deionized water | 2295 | lbs. | (1042 kg.) |
| Sodium sulfosuccinate isodecanol emulsifier "Aerosol A-268", sold by American Cyanamid) | 9 | lbs. | (4.1 kg.) |
| Sodium bicarbonate buffer | 1362 | g. | |
| Ammonium persulfate initiator | 1362 | g. | |

The emulsifier, buffer and initiator were each premixed with water in a suitable container prior to being charged into the reactor.

(c) The agitator in the reactor was turned on to a low speed setting and the mixture of water, emulsifier, buffer and initiator was agitated for five minutes.

(d) Approximately 500 lbs. (227 kg.) of the butyl acrylate/butylene glycol diacrylate mixture from (a) was added to the reactor and, after the air space has been flushed with nitrogen and evacuated to a pressure of 0 psi (0 kg./cm.$^2$), the reaction mixture was heated to 60° C. After the first exothermic reaction was noted an additional 252 lbs. (114.4 kg.) of butyl acrylate/butylene glycol diacrylate was charged to the reactor, and the temperature was maintained at 60° C. through a second exothermic reaction. The solids content of the reactor was measured after this exothermic reaction occured and when it reached greater than 24 weight percent, this reaction was judged complete.

Step 2

(a) To an empty polyethylene lined drum were added the following reagents:

| Reagent | Amount | |
|---|---|---|
| Styrene | 229 | lb. (104 kg.) |
| Acrylonitrile | 84.6 | lb. (38.4 kg.) |
| Divinyl benzene crosslinker (72 wt. % solution) | 453 | g. |

This mixture was agitated well.

(b) To the reaction mixture in Step 1 was added an additional 310 g. of sodium sulfosuccinate isodecanol half ester emulsifier ("Aerosol A-268" from American Cyanamid Co.), and the mixture was agitated for 10–15 minutes. The styrene/acrylonitrile/divinyl benzene mixture was then charged to the mixture until a total of 274 lbs. (124.4 kg.) had been charged. The temperature was maintained at 60° C. until the exothermic reaction that was noted began to subside. The percent solids content of the reaction was checked each half hour until the solids content exceeded 30.5% by weight of the reaction medium. The reaction medium was then cooled to 30° C., the reactor agitator was turned off, and the mixture was strained to isolate the crosslinked butyl acrylate/crosslinked styrene-acrylonitrile product.

Step 3

(a) Into each of two 55 gal. (208.175 liter) drums were added each of the following reagents:

| Reagent | Amount | |
|---|---|---|
| Styrene | 285.15 | lb. (129.46 kg.) |
| Acrylonitrile | 105.5 | lb. (47.90 kg.) |
| t-dodecyl mercaptan chain transfer agent | 426 | g. |

The reagents were mixed for about 15 minutes.

(b) Into an evacuated 500 gal. (1892.5 liter) glass lined reactor were charged each of the following reagents:

| Reagent | Amount | |
|---|---|---|
| Latex from Steps 1 and 2 | 1537 | lbs. (697.80 kg.) |
| Deionized water | 1588 | lbs. (720.95 kg.) |
| Sodium lauryl sulfate emulsifier ("Sipex UB", sold by Alcolac) | 13 | lbs. (5.90 kg.) |
| Ammonium persulfate initiator | 961.2 | g. |

The mixture was agitated for 5 minutes at low speed and two drums of the styrene/acrylonitrile/t-dodecyl mercaptan mixture was added. Another 5 minute agitation, flushing of the air space with nitrogen and application of vacuum was performed. The vessel was at 0 psi (0 kg./cm.$^2$) at this point.

(c) The reaction mixture was then heated to 60° C., and this temperature was maintained through the exothermic reaction that occurred. The solids content was measured every ½ hour until it reached at least 31% by weight of the reaction mixture. The reactor was cooled to 30° C.

(d) The reaction was short stopped by adding to the reaction mixture 55 lbs. (25 kg.) of an aqueous mixture formed by mixing 45 lbs. (20.43 kg.) of water, 11 lbs. (4.99 kg.) of butylated hydroxytoluene and 533 g. of a sodium salt of an alkylaryl polyether sulfonate emulsifier ("Triton X-200", sold by Rohm and Haas Co.) and 1135 g. of a hindered phenol stabilizer ("Irganox 1010", sold by Ciba-Geigy Chemical Corp.). Agitation was applied for 15-30 minutes to the reaction medium. Thirty eight pounds (17.25 kg.) of a 20% by weight aqueous dispersion of lithium stearate was then added, and the product was recovered by filtration.

RUN B

The same procedure used in Run A was employed with the following exceptions:

The amount of emulsifier used in Step 1 was raised from 0.6% by weight to 0.8% by weight, based on the amount of butyl acrylate, and no additional emulsifier was used in Step 2. The amount of emulsifier used in Step 3 was 0.75% by weight of styrene and acrylonitrile, rather than 0.5% by weight as in Run A. No lithium stearate stabilizer was added when Step 3 was terminated.

EXAMPLE 2

This Example illustrates the good results obtained when extruding the ASA resin of U.S. Pat. No. 3,944,631 to A. J. Yu et al. with a polyethylene lubricant having the molecular weight and melt index properties desired for use in the present invention, and the poorer results obtained when using a polyethylene lubricant not having the desired molecular weight and melt index properties.

The ASA resin made by the polymerization procedure described in Example 1 (Run A), containing 0.6 parts by weight lithium stearate per 100 parts by weight of ASA resin, was milled in a 2-roll mill having the front and back rolls at temperatures of 196° C. and 199° C., respectively, with polyethylene lubricant. The Table given below sets forth the amounts of ASA resin and polyethylene lubricant that were used (in grams) along with the results that were obtained. Run A is in accordance with the present invention, whereas Run B is given for comparison purposes.

|  | A | B |
|---|---|---|
| ASA Resin | 300 | 300 |
| Polyethylene Lubricant[1] | 1.5 | — |
| Polyethylene Lubricant[2] | — | 1.5 |
| Gloss[3] | Good | Fair |
| Appearance[4] | Excellent | Good |

Footnotes:
[1]The lubricant that was used is "Alathon PE 4275", sold by E.I. du Pont de Nemours and Co., Wilmington, DE. It has molecular weight and melt index values within the ranges desired for the present invention.
[2]The lubricant that was used is "Microthene FN 510", sold by U.S. Industrial Chemicals Co. It has a molecular weight of around 25,000 which is far lower than desired for use in accordance with the present invention.
[3]Gloss was evaluated by visual inspection. "Good" means that the surface exhibited no scratch lines from the extrusion and that the surace exhibited a semi-gloss. "Fair" means that the surface of the extruded product was smooth but exhibited scratch lines and less gloss.
[4]Appearance was evaluated by visual inspection. "Excellent" means that the surface of the extruded product had a high gloss and was smooth. "Good" means that the surface of the extruded product was smooth with no scratch line and that it exhibited a semi-gloss.

EXAMPLE 3

This Example illustrates the enhanced effects obtained when ASA resin Example 1 (Run B) is mixed with the desired polyethylene lubricant in the absence of a lithium stearate lubricant as compared to an ASA/polyethylene lubricant composite having such an additive.

Two samples of ASA resin made in accordance with Example 1 were prepared. Sample A contained 0.5 part by weight per 100 parts by weight of ASA resin of the desired polyethylene polymer for use in the present invention ("Alathon 4275"), whereas Sample B also contained 0.6 part by weight per 100 parts by weight of resin of lithium stearate. After mixing in a 2 roll mill at 360° C. for 10 minutes, the ASA resin containing the lithium stearate was a light brown to tan color, whereas the ASA resin not containing this additive was a more desirable cream color.

EXAMPLE 4

This Example illustrates the variation in results obtained when ASA resin (Example 1, Run B) was extruded in a Brabender ribbon die at 215.6° C. using a variety of polyethylene and polyethylene waxes each having different molecular weight properties. Run Nos. 1-3 are presented for comparison purposes, whereas Run No. 4 illustrates the present invention.

Run No. 1: ASA resin containing 1.0 part by weight of a low molecular weight polypropylene lubricant having a molecular weight of about 14,000 ("Epolene N 15", sold by Eastman Chemical Co.) per 100 parts by weight ASA resin was extruded. No gloss development was apparent on the extruded sheet.

Run No. 2: ASA resin containing 1.0 parts by weight of a high molecular weight polyethylene lubricant (available as "PEP 680" from Union Carbide Corporation) per 100 parts by weight ASA resin and 1.0 part by weight of low molecular weight polyethylene wax having a molecular weight of about 23,000 ("Epolene Wax C14" available from Eastman Chemical Co.) was extruded. The gloss on the extruded sheet was somewhat improved over the gloss of an extruded ASA sheet formed in accordance with Run No. 1.

Run No. 3: ASA resin containing 1.0 part per hundred of a low molecular weight polyethylene wax having a molecular weight of about 23,000 ("Epolene C14") from Eastman Chemical Co.) per 100 part by weight of ASA resin and 0.5 part by weight of calcium stearate lubricant was extruded. Good gloss development on the extruded sheet was noted, but die streaks were also present.

Run No. 4: ASA resin containing 1.0 part per hundred of high molecular weight polyethylene lubricant having a melt index of about 1.5 ("PEP 680" sold by Union Carbide) per 100 parts by weight of ASA resin was extruded as described in Run No. 1. The extruded sheet had a good gloss and was free of die streaks.

EXAMPLE 5

This Example illustrates that use of polyethylene polymers having a molecular weight greater than about 1,000,000 do not yield a high gloss extrudate.

ASA resin made in accordance with Example 1 (Run B) was mixed with 1.5 parts by weight of an ultra-high molecular weight polyethylene polymer with a molecular weight of approximately 20,000,000 (available as "Alathon 7840" from E. I. Du Pont de Nemours and Co.) and an attempt was made to extrude the resin. The extrudate had a marbled appearance due to the presence of collections of polyethylene polymer within the matrix of the resin.

The above Examples of illustrate certain preferred embodiments of the claimed invention and should not be constructed in a limiting sense. The scope of protection that is sought is set forth in the claims which follow.

What is claimed is:

1. In an extrusion process for a discrete phase, elastomer-containing thermoplastic polymer comprising crosslinked acrylate or methacrylate, crosslinked styrene-acrylonitrile and uncrosslinked styrene-acrylonitrile polymeric components to form products by extrusion in an extrusion apparatus wherein the improvement comprises using an effective amount for extrusion lubrication of a lubricant selected from the group consisting of polyethylene and poly(ethylene/vinyl acetate) having molecular weights of from about 100,000 to about 1,000,000 to produce products with a high surface gloss.

2. A process as claimed in claim 1 wherein the lubricant has a melt index of from about 1.0 to about 25 g./10 min. and a specific gravity of about 0.90 to about 0.94.

3. A process as claimed in claim 1 wherein the amount of lubricant ranges from about 0.5 to about 1.5 parts by weight of lubricant per 100 parts by weight of thermoplastic polymer.

4. A process as claimed in claim 1 wherein the lubricant has a molecular weight of from about 100,000 to about 1,000,000 and the amount of lubricant ranges from about 0.5 to about 1.5 parts by weight of lubricant per 100 parts by weight of thermoplastic polymer.

5. A process as claimed in claim 1 wherein the lubricant is passed through the extrusion apparatus prior to the extrusion run when the polymer is actually extruded.

6. An extruded discrete phase, elastomer containing thermoplastic polymer product comprising crosslinked acrylate or methacrylate, crosslinked styrene-acrylonitrile, and uncrosslinked styrene-acrylonitrile polymeric components having a high surface gloss such that the polymer product reflects about 80% or greater of incident light when measured at a 60° angle from the perpendicular to the surface of the product.

* * * * *

UNITED STATES PATENT AND TRADEMARK OFFICE
CERTIFICATE OF CORRECTION

PATENT NO.  : 4,329,310

DATED       : May 9, 1989

INVENTOR(S) : Ferril A. Losee

It is certified that error appears in the above-identified patent and that said Letters Patent is hereby corrected as shown below:

Column 2, line 4, "undergroundlow" should be --underground low--
Column 4, line 64, "along side" should be --alongside--
Column 5, line 1, "prevent" should be --prevents--
Column 8, line 16, "is is" should be --is--
Column 10, line 46, "tramsmitter/receiver 13" should be --transmitter/receiver 13--
Column 12, line 9, "apparent" should be --apparent.--
Column 18, line 41, "he transmitter/receiver," should be --the transmitter/receiver,--
Column 21, line 50, "current driver 10" should be --current driver 100--
Column 29, line 39, "capacitively coupling step" should be capacitive coupling step--
Column 31, line 4, "capacitively coupling step" should be --capacitive coupling step--

Signed and Sealed this

First Day of October, 1991

Attest:

HARRY F. MANBECK, JR.

Attesting Officer

Commissioner of Patents and Trademarks